(12) United States Patent
Yeo

(10) Patent No.: US 7,200,961 B2
(45) Date of Patent: Apr. 10, 2007

(54) MOUNTING ASSEMBLY FOR A LICENSE PLATE

(75) Inventor: Sung Mo Yeo, Hwaseong-si (KR)

(73) Assignee: Kia Motors Corporation, Seocho-Ku, Seoul (KR)

( * ) Notice: Subject to any disclaimer, the term of this patent is extended or adjusted under 35 U.S.C. 154(b) by 88 days.

(21) Appl. No.: 11/025,476

(22) Filed: Dec. 29, 2004

(65) Prior Publication Data

US 2006/0059735 A1   Mar. 23, 2006

(30) Foreign Application Priority Data

Jun. 1, 2004   (KR) .................... 10-2004-0039718

(51) Int. Cl.
*G09F 7/00* (2006.01)
(52) U.S. Cl. .......................... 40/209; 40/210
(58) Field of Classification Search ............. 40/209, 40/210
See application file for complete search history.

(56) References Cited

U.S. PATENT DOCUMENTS

| | | | | |
|---|---|---|---|---|
| 1,393,971 A | * | 10/1921 | Van Cleve et al. | 40/205 |
| 1,758,627 A | * | 5/1930 | Sweitzer | 40/209 |
| 2,173,134 A | * | 9/1939 | Vokaty | 40/203 |
| 2,914,149 A | * | 11/1959 | Walker | 52/394 |

* cited by examiner

*Primary Examiner*—Cassandra Daviis
(74) *Attorney, Agent, or Firm*—Morgan Lewis & Bockius LLP

(57) ABSTRACT

The mounting assembly of a license plate includes a license plate having at least one fastening aperture, a frame, on one side of which the license plate is mounted, a fixing member located at the other side of the frame, opposite to the license plate, and a fastening mechanism for coupling the license plate and the fixing member to the frame. The frame is provided with an opening and a shock-absorbing member fitted into the opening. The license plate is fastened to the frame by attaching the license plate to the shock-absorbing member.

5 Claims, 2 Drawing Sheets

MOUNTING ASSEMBLY FOR A LICENSE PLATE

CROSS REFERENCE TO RELATED APPLICATION

This application is based on, and claims priority to Korean Patent Application No. 2004-0039718, filed on Jun. 1, 2004, the disclosure of which is hereby incorporated by reference.

TECHNICAL FIELD

The present invention relates to a mounting assembly of a license plate for a vehicle, and more particularly to a mounting assembly of a license plate, which is capable of accommodating various license plates having different dimensions according to traffic laws and regulations of an importing country.

BACKGROUND

Under traffic regulations or laws of a country, every vehicle should be furnished with a license plate at a predetermined position of the front end and/or the rear end of the vehicle for identification purposes. License plates are typically mounted on a frame attached to a front and/or rear bumper.

However, in case of exported vehicles, the vehicle manufacturer should take into consideration that the dimension of a license plate and the locations of the fastening apertures vary from country to country. Namely, the conventional mounting assembly of license plates is disadvantageous in that the frame should be provided with a plurality of fastening apertures at different locations so as to comply with the dimensions of the license plate in each country. Forming of a plurality of fastening apertures frequently results in damage to a coating layer of the frame. This damage may cause corrosion of the frame. In addition, precipitation may be introduced into the inside of the frame through the unused fastening apertures.

Moreover, in the interests of economy, the conventional mounting assembly of the license plate is disadvantageous in that the manufacturing device and cost should be increased in order to control the manufacturing system in accordance with the rules and regulations of an exporting country.

SUMMARY OF THE INVENTION

The present invention provides a mounting assembly of a license plate, which is capable of accommodating various license plates having different dimensions according to an importing country. The present invention also provides a mounting assembly of a license plate, which enhances the convenience of use leading to improvement in overall quality of the product.

One embodiment of a mounting assembly of a license plate according to the present invention includes a license plate having at least one fastening aperture, a frame, on one side of which the license plate is mounted, a fixing member that is located at the other side of the frame, opposite to the license plate, and a fastening means for coupling the license plate and the fixing member to the frame. The frame is provided with an opening and a shock-absorbing member fitted into the opening. The license plate is fastened to the frame by attaching the license plate to the shock-absorbing member.

Preferably, the opening is provided with a stopper with contour thereof. The shock-absorbing member comprises an inserting portion fitted into the opening formed on the frame and a step-shaped edge having a first step contacting the frame and a second step contacting the stopper formed along with the opening.

BRIEF DESCRIPTION OF THE DRAWINGS

The aforementioned aspect and other features of the present invention will be explained in the following detailed description, taken in conjunction with the accompanying drawings, wherein.

DETAILED DESCRIPTION OF THE EMBODIMENTS

Figure 1:
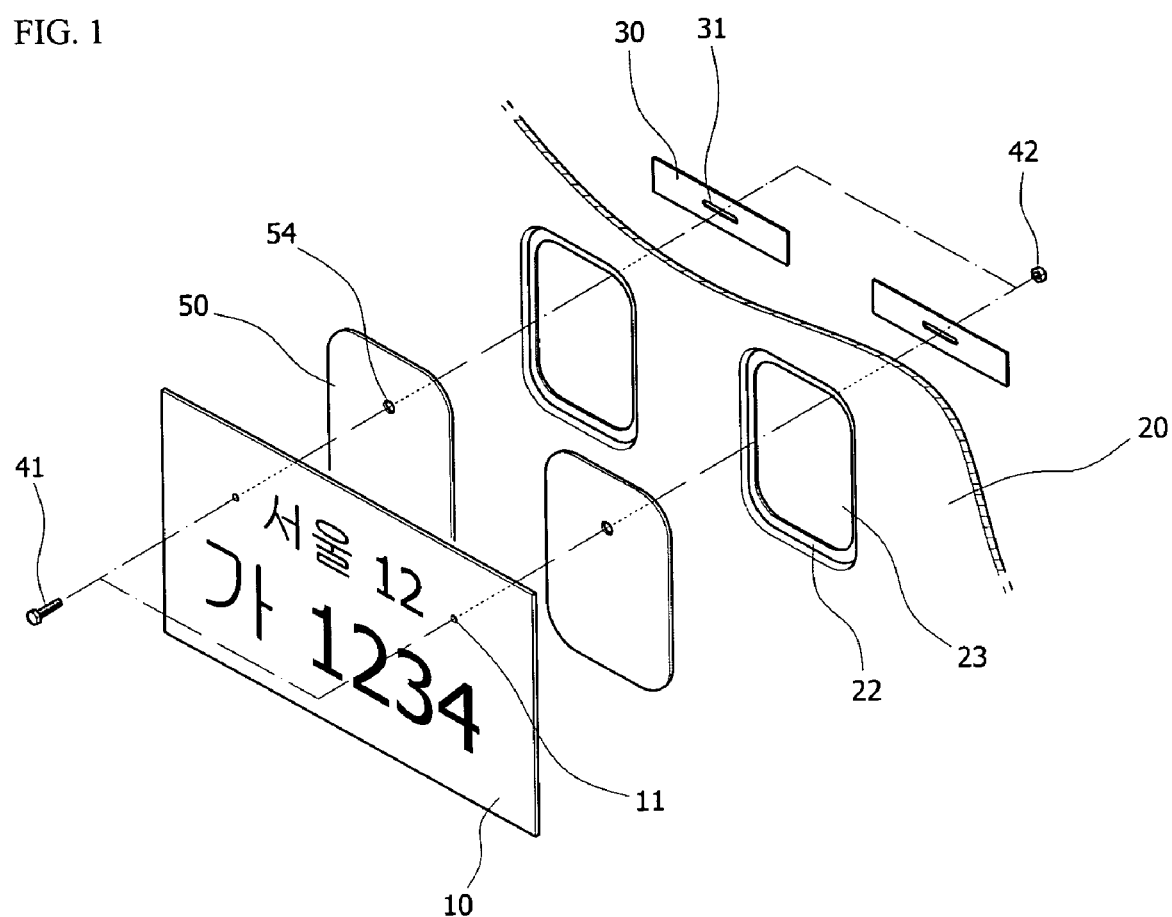
FIG. 1 is an exploded perspective view of a mounting assembly of a license plate according to an embodiment of the present invention.
Figure 2:
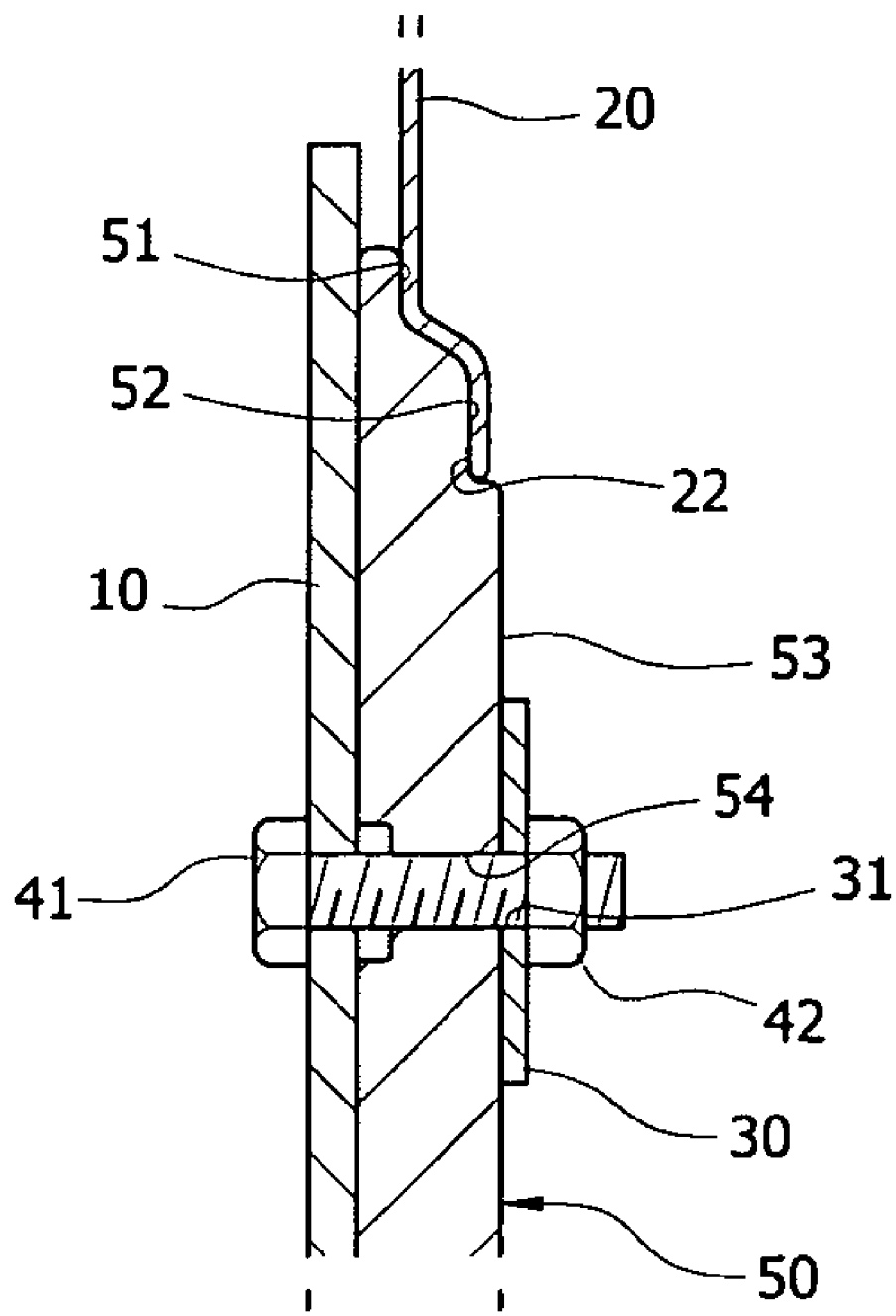
FIG. 2 is an enlarged cross-sectional view of a mounting assembly of a license plate according to an embodiment of the present invention.

Referring to the accompanying FIG. 1 and FIG. 2, the preferred embodiment of the present invention comprises a license plate 10, a frame 20, a fixing member 30, one or more bolts 41, one or more nuts 42, and a shock-absorbing member 50. The license plate 10 bears an ID number on the front surface thereof for identification of a vehicle and at least one fastening aperture 11 there through.

The frame 20 is provided with an opening 23 of a rectangular shape at a portion which substantially corresponds to the position of the fastening aperture 11 of the license plate 10. The shape of the opening 23 may be changed in accordance with the needs. The opening 23 is furnished with a stopper 22 along its contour.

The fixing member 30 serves to securely fix the license plate to the frame 20 and includes a slit 31 which is aligned with the fastening aperture 11 of the license plate 10. The size of the fixing member 30 is substantially bigger than the opening 23 so that the license plate 10 cannot escape from the frame 20 when combined with fixing member 30.

In the preferred embodiment, a fastening means comprising a bolt 41 inserted through the fastening aperture 11 of the license plate 10. A corresponding nut 42, disposed at a rear surface of the fixing member 30, is employed so as to fix the license plate 10 to the frame 20. It should be appreciated that any type of fastening means may be employed as known to an ordinary person skilled in the art.

The shock-absorbing member 50 is sandwiched between the license plate 10 and the frame 20, and is made of a resilient material such as rubber or a synthetic resin. The shock-absorbing member 50 comprises an inserting portion 53 that fits into the opening 23 formed on the frame 20 and a step-shaped edge having a first step 51 and a second step 52. The first step 51 is caught by the frame 20 itself while the second step 52 is caught by the stopper 22 formed along the contour of the opening 23.

In the mounting procedure of a license plate according to the present invention, the opening 23 with the stopper 22 is formed on the frame 20. Subsequently, the shock-absorbing member 50 is fitted into the opening 23 while the second step 52 is supported by the stopper 22. On the shock-absorbing member 50, a through hole 54 is bored aligning with the fastening aperture 11 of the license plate 10.

Because the shock-absorbing member 50 is made of a resilient material such as rubber or synthetic resin, the boring process of the through hole 54 is readily conducted by a mechanic of the importing country in accordance with its own dimension of the license plate.

After arranging the license plate 10 and the fixing member 30 at the front of the frame 20 bearing the shock-absorbing member 50 and at the rear side of the frame, respectively, a fastening means is installed thereto so as to firmly secure the license plate 10 to the frame 20. Namely, the bolt 41 is inserted through the fastening aperture 11 of the license plate 10, the through hole 54 of the shock-absorbing member and the slit 31 of the fixing member 30, and coupled with the nut 42.

Even though the present invention is described in detail with reference to the foregoing embodiments, it is not intended to limit the scope of the present invention thereto. It is evident from the foregoing that many variations and modifications may be made by a person having an ordinary skill in the present field without departing from the essential concept of the present invention.

As described above, the mounting assembly of a license plate according the present invention is advantageous in that the corrosion of the frame 20 and inflow of precipitation are effectively prevented by boring the through hole 54 at a desired position only in accordance with the dimension of the license plate 10.

Further the mounting assembly of a license plate according the present invention is advantageous in that the vibration of the license plate 10 during driving can be significantly reduced by employing the shock-absorbing member 50.

What is claimed is:

1. A mounting assembly of a license plate, the mounting assembly comprising:
    a license plate having at least one fastening aperture;
    a frame, on one side of which the license plate is mounted;
    a fixing member that is located at the other side of the frame, opposite to the license plate; and
    a fastening means for coupling the license plate and the fixing member to the frame;
    wherein the frame is provided with an opening, the opening being provided with a stopper along a contour thereof, and the frame is further provided with a shock-absorbing member fitted into the opening, wherein the shock-absorbing member comprises:
        an inserting portion that fits into the opening formed through the frame;
        a step-shaped edge having a first step contacting the frame; and
        a second step contacting the stopper;
    the license plate being fastened to the frame by attaching the license plate to the shock-absorbing member.

2. A mounting assembly of a license plate, the mounting assembly comprising:
    a license plate having at least one fastening aperture;
    a frame, on one side of which the license plate is mounted;
    a fixing member that is located at the other side of the frame, opposite to the license plate; and
    a fastening means for coupling the license plate and the fixing member to the frame,
    wherein the frame is provided with an opening and a shock-absorbing member fitted into the opening, the license plate being fastened to the frame by attaching the license plate to the shock-absorbing member, and wherein the shock-absorbing member comprises an inserting portion fitted into the opening formed on the frame and a step-shaped edge having a first step contacting the frame and a second step contacting the stopper formed along with the opening.

3. A mounting assembly of a license plate, the mounting assembly comprising:
    a frame having substantially flat opposing first and second sides and defining at least one opening, said opening being provided with a stopper along a perimeter thereof and disposed between said first and second sides, wherein said first side is adapted to have a license plate mounted thereon;
    a fixing member disposed at said second side of said frame;
    a fastening mechanism configured to couple the license plate to said fixing member through said opening; and
    a shock-absorbing member configured to fit at least partially within said opening between the license plate and the frame and fixing member, wherein the shock-absorbing member comprises:
        an inserting portion that fits into the opening formed through the frame;
        a step-shaped edge having a first step contacting the frame; and
        a second step contacting a stopper formed along an inside edge of the opening.

4. The mounting assembly of a license plate according to claim 3, wherein the fastening mechanism is at least one bolt and nut.

5. The mounting assembly of a license plate according to claim 3, wherein the fixing member is larger than said opening.

* * * * *